C. B. WILSON.
DETACHABLE SPINDLE.
APPLICATION FILED APR. 5, 1910.
978,096.
Patented Dec. 6, 1910.
2 SHEETS—SHEET 1.
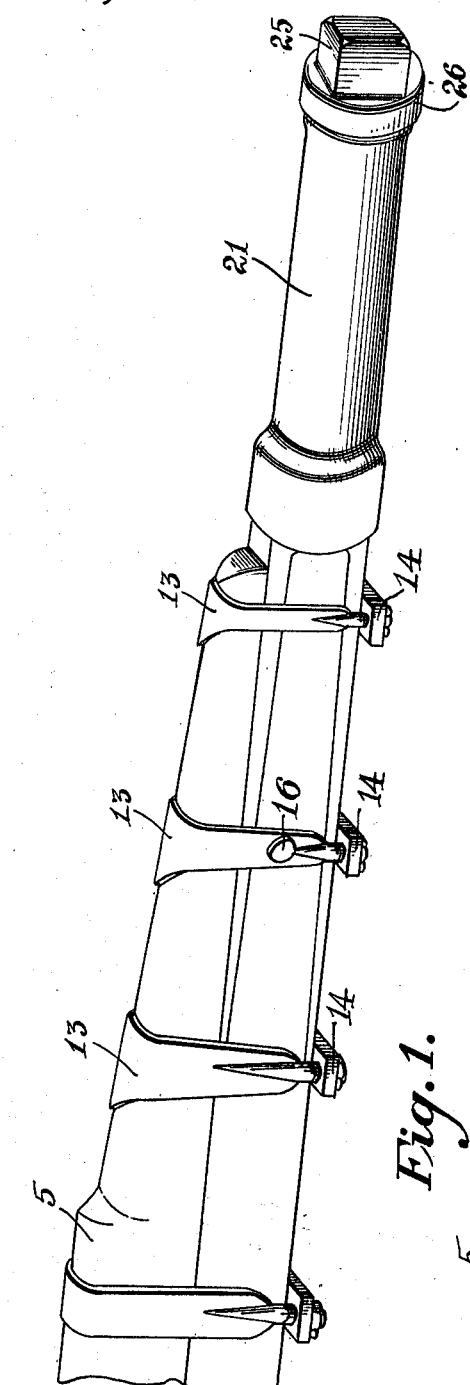
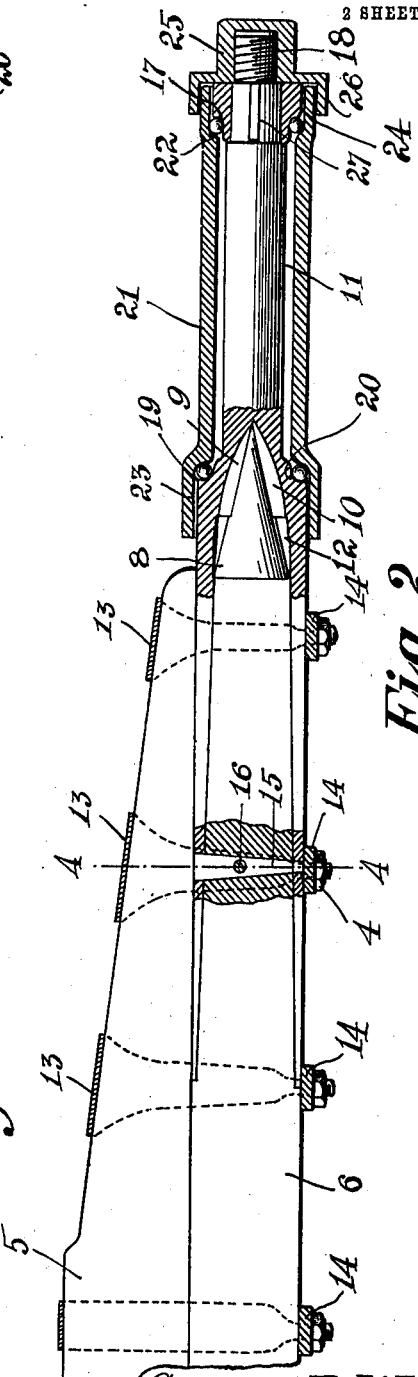
Inventor
Charlie B. Wilson,
By Victor J. Evans
Attorney C. B. WILSON.
DETACHABLE SPINDLE.
APPLICATION FILED APR. 5, 1910.
978,096.
Patented Dec. 6, 1910.
2 SHEETS—SHEET 2.
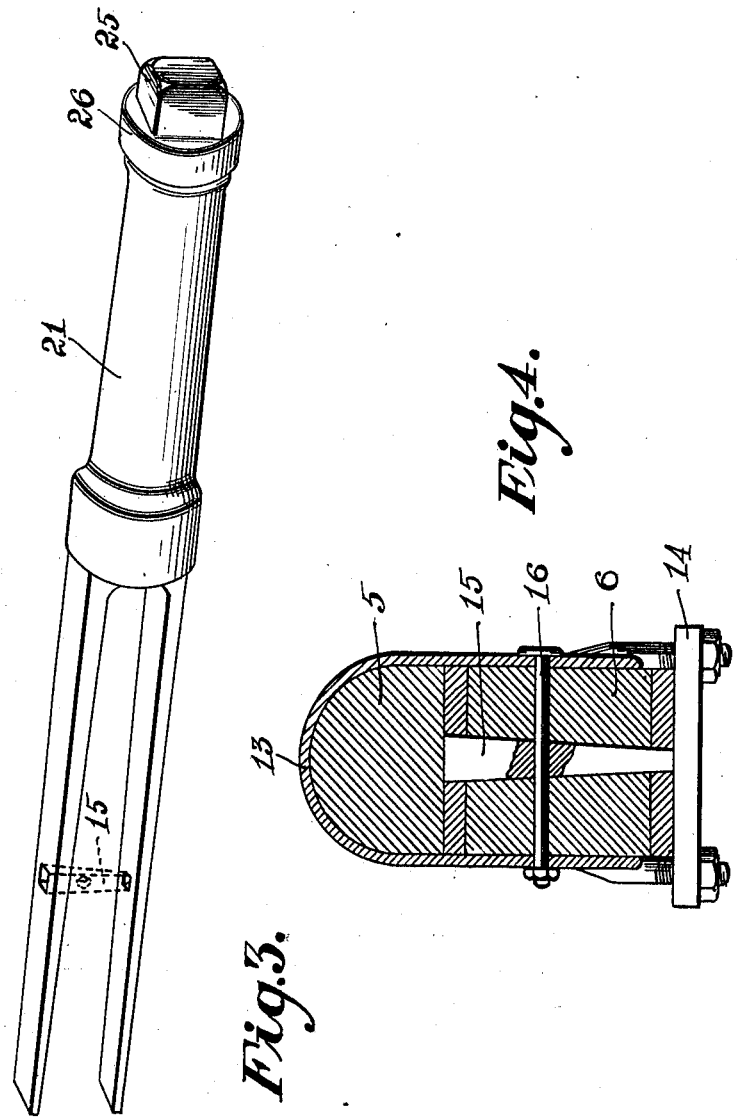
Witnesses
Thos. F. Knox.
John A. Dempsey
Inventor
Charlie B. Wilson,
By Victor J. Evans
Attorney

UNITED STATES PATENT OFFICE.

CHARLES B. WILSON, OF BARTOW, FLORIDA.

DETACHABLE SPINDLE.

978,096. Specification of Letters Patent. Patented Dec. 6, 1910.

Application filed April 5, 1910. Serial No. 553,516.

*To all whom it may concern:*

Be it known that I, CHARLES B. WILSON, a citizen of the United States, residing at Bartow, in the county of Polk and State of Florida, have invented new and useful Improvements in Detachable Spindles, of which the following is a specification.

This invention relates to improvements in vehicle axles and has particular reference to a construction whereby an ordinary vehicle axle may without the necessity of expensive alterations be converted to a shaft and receive a spindle, the latter constructed to provide a ball or roller-bearing surface for the hub of the vehicle wheel.

Another object is the provision of a construction whereby the spindle may be readily detached from the axle whenever desired for purposes of repair or to replace a new spindle.

With these and other objects in view, which will more fully hereinafter appear, the present invention consists in certain novel details of construction and arrangement of parts, hereinafter fully described, illustrated in the accompanying drawings and more particularly pointed out in the appended claim; it being understood that various changes in the form, proportion, size, and minor details of the device may be made, within the scope of the appended claim, without departing from the spirit or sacrificing any of the advantages of the invention.

In the accompanying drawings forming a part of the specification:—Figure 1 is a perspective view of one end of an axle and also of the bed and showing my improved spindle in position on the axle. Fig. 2 is a longitudinal sectional view thereof. Fig. 3 is a view similar to Fig. 1 with the spindle removed. Fig. 4 is a sectional end view on the line 4—4 of Fig. 2.

Similar numerals of reference are employed to designate corresponding parts throughout.

The axle bed is designated by the numeral 5 and in the present instance is shown to be of wood and arranged on the upper side of the axle 6. In the drawings I have shown only one end of the axle bed. It must be understood however, that the construction about to be described will be exactly the same on the opposite end of the axle and axle bed.

The axle 6 has its outer end of peculiar construction inasmuch as it terminates at a slight distance in advance of the end of the bed 5 and does not end in the usual spindle. That portion of the axle 6 underlying the end portion of the bed is tapered as shown at 8, the said taper extending to the outer end of the axle. With this construction it will be evident that a space will be formed between the adjacent surfaces of the axle and bed.

Formed at diametrically opposite points on that portion of the axle extending in advance of the bed 5 and extending longitudinally of the axle are ribs 9 and 10, the function of which will appear later.

The spindle forming a portion of the subject matter of the present invention is designated by the numeral 11 and what will subsequently be termed its inner half is provided with a tapered bore 12, which receives the tapered end 8 of the axle. The bore of the spindle is provided with diametrically opposite grooves which receive the ribs 9 and 10, so that when the parts are positioned as shown in Fig. 1 turning movement of the spindle upon the axle will be positively prevented. The inner half of the spindle corresponds in length to the length of the tapered portion 8, or substantially so and when positioned on the tapered end of the axle it will bear on the adjacent face of the bed 5 as shown in the drawings.

The axle and bed are secured together by means of the usual clevises 13, which straddle the bed and axle in a well known manner and have their lower ends connected by the transverse straps 14.

Endwise movement of the spindle upon the axle is prevented by means of a pin 15. This member is tapered and passes through alining transverse openings formed in the spindle and axle and adjacent to the inner end of the said spindle. The pin is medially provided with a slot which alines with transverse openings arranged in the spindle and axle and perpendicular to the openings for the pin, the last named transverse openings receiving a bolt 16, which is secured in any preferred manner against displacement in the slots.

With this construction it will be manifest that the pin simply overcomes the tendency of the spindle to move endwise, the tendency of the spindle to turn, which of course is greater than the tendency to move endwise, being overcome by the ribs 9 and 10, furthermore by tapering the socket and axle the parts are rendered easy of detachment after remaining assembled for a comparatively long time.

The outer half of the spindle or that extending in advance of the bed may be tapered or of uniform diameter according to the shape of the boxing to be employed.

In the present instance the extremity of the outer end portion of the spindle is reduced as shown at 17 to provide a race for balls or roller-bearings and that portion of the spindle extending in advance of the race 17 is provided with an exteriorly threaded boss 18. Adjacent to the outer end of the bed a circular shoulder 19 is formed on the spindle, the outer side of said circular shoulder being curved as shown at 20 to provide a race for the inner balls or roller-bearings.

The box is designated by the numeral 21 and its opposite ends coöperate as shown at 22 and 23 with the grooves 17 and 19 to retain the balls or roller-bearings in position. A cup 24 is placed over the reduced portion 17 of the axle and serves to prevent displacement of the balls or rollers in the race.

The nut for securing the hub in position is designated by the numeral 25 and has an opening to receive the threaded boss 18 and is provided with angular flanges 26 which bear on the outer surface of the cup 24, whereby a dust proof covering is provided, the cup 24 having a transverse slot which alines with a similar slot formed in the reduced portion of the spindle, these slots receiving a key 27 which prevents movement of the cup on the spindle.

From the foregoing it will be seen that I have provided a device which is comparatively simple in structure and inexpensive in manufacture, embodying few parts and these so arranged that the danger of derangement will be reduced to a minimum.

Having thus described the invention, what is claimed as new is:—

An axle adapted to be secured to the lower side of an axle bed and having its opposite end portions tapered and extending in advance of the outer ends of the bed and terminating in a cone-shaped portion, and provided with oppositely positioned longitudinal ribs, in combination with a spindle having a tapered bore in one end to receive one of the tapered ends of the axle, the said bore having oppositely positioned slots to receive the said ribs, the said bored end portion being insertible into the space formed by the undercut and tapered end portion of the axle and a tapered pin passing through alining openings in the axle and spindle and serving to prevent endwise movement of the spindle on the axle.

In testimony whereof I affix my signature in presence of two witnesses.

CHARLIE B. WILSON.

Witnesses:
T. G. HALE,
GILLIE MILLS.